Jan. 14, 1964    E. G. SUNDBERG    3,117,893
ELECTRODE PLATE GRID FOR STORAGE BATTERY
Filed June 26, 1961
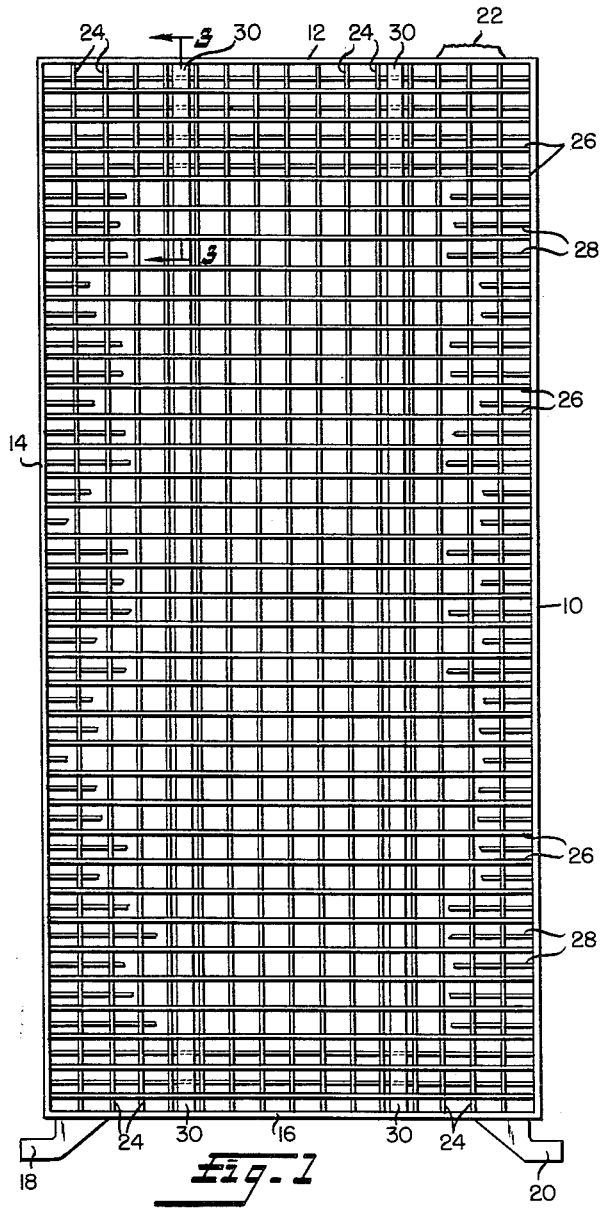
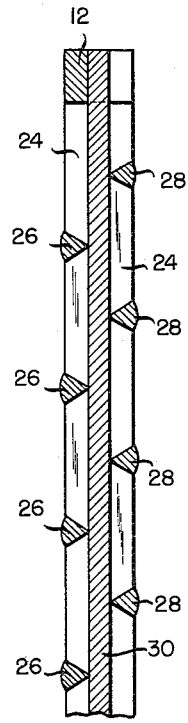
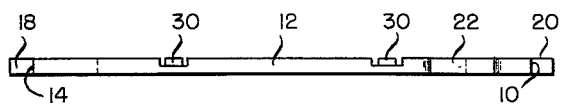
INVENTOR
Erik Gustav Sundberg
BY
ATTORNEYS

United States Patent Office 3,117,893
Patented Jan. 14, 1964

3,117,893
ELECTRODE PLATE GRID FOR STORAGE BATTERY
Erik G. Sundberg, Nol, Sweden, assignor to Aktiebolaget Tudor, Stockholm, Sweden, a corporation of Sweden
Filed June 26, 1961, Ser. No. 119,355
Claims priority, application Sweden Aug. 19, 1960
5 Claims. (Cl. 136—51)

This invention relates to lead-acid electric storage or secondary batteries of the type in which the electrodes are constituted by grids made of lead or a lead alloy, the interstices of the grids being filled with paste which is treated to form the active material of the battery, and more particularly to an improved battery plate of the foregoing type having reduced internal electrical resistance and increased strength against buckling.

In batteries of this type, lead or lead alloy grids, which will be collectively referred to as lead grids, are usually cast and comprise a relatively strong marginal frame. Between the marginal frame members a plurality of spaced, staggered, cross members or grid bars are provided which are relatively thin and normally triangular in cross section so as to permit the paste to adhere to and key with the bars, and at the same time reduce the area of the exposed metal to a minimum. It has been found that when such plates are in service, and this applies especially to long plates, that is plates having a large vertical dimension, the grid members of the plate grids apparently are incapable of conducting the electro-chemically generated current with sufficiently low losses.

Prior efforts to reduce the internal electrical resistance by incorporating pieces of metal having a higher conductivity than lead by way of casting such pieces into the marginal frame have been unsuccessful. As the marginal frame of the grid and also the grid bars have such small cross sectional dimensions which are on the order of a few hundredths of an inch, only exceedingly thin metal wire pieces can be incorporated into the grid bars without interference with the configuration of the plate. The casting of plates with the metal pieces in the mold parts not only is difficult to perform but did not result in a noticeable improvement in the reduction of the internal electrical resistance or in the tendency of the plates to buckle.

It is an object of the present invention to provide an improved electrode plate construction having both decreased electrical resistance and increased resistance against buckling together with better exploitation of the active material in the grid plates than has heretofore been possible.

Another object of the invention is to provide a storage battery with fewer plates and a smaller weight and volume for a corresponding capacity of the plates as constructed with prior techniques.

Still another object of this invention is to provide a novel plate construction which reduces troubles due to the buckling of plates, and thereby provides a battery which has a longer useful life and which can withstand more severe service.

A further object of the invention is to provide a strip of lead coated aluminum between the vertical bars of the grid and in contact with the horizontal bars of the grid to thus reduce the electrical resistance of the grid and increase its mechanical strength against buckling.

These and other objects of the invention will become more fully apparent from the claims, and from the description as it proceeds in connection with the drawings wherein:

FIGURE 1 is a front elevation view of a grid type battery plate constructed in accordance with the present invention;

FIGURE 2 is a top plan view of the plate of FIGURE 1; and

FIGURE 3 is a side elevation view of the grid plate taken along lines 3—3 of FIGURE 1.

Referring now to the drawings which illustrate a conventional plate grid modified in accordance with the present invention, the grid per se comprises a marginal frame having four members 10, 12, 14 and 16 with bottom support legs 18 and 20 and an upper terminal 22 to which several electrodes of the same polarity are connected together in what is referred to as a plate group. The grid is composed of what may be referred to as three groups of angularly related bars. The first group of bars 24 lie substantially at the central plane of the plate, extend vertically between the upper and lower frame members 12 and 16, and conventionally may have a width as viewed in FIGURE 1 on the order of ten hundredths of an inch and a thickness in the order of twenty hundredths of an inch. Two groups of horizontal bars are provided. The group consisting of bars 26 are on one side of vertical bars 24 of the plate and the group consisting of horizontal bars 28 are on the other side of the vertical bars 24. The bars 26 and 28 of each of the two groups are substantially parallel to each other and in the illustrated embodiment parallel to each other. However, oblique bars disposed at angles may be used instead of or with horizontal bars 26 and 28 if desired.

The vertically arranged bars 24 which are in the central plane of the grid, are of slightly smaller cross-section than the marginal frame members which means that bars 24 are covered with active material when the grid is pasted. The horizontal bars 26 and 28 are staggered and leave the central plane free and are arranged alternately on opposite sides of vertical bars 24. Horizontal bars 26 and 28 are also covered with active material when the plate is pasted.

When manufacturing the grid frames, the grids are ordinarily cast in molds which are divided in the central plane and vertical bars 24 are engraved in each mold part whereas the horizontal bars 26 of one group are engraved in one mold and the horizontal bars 28 of the other group are engraved in the other mold. The horizontal bars 26 and 28 conventionally have a diamond shape or triangular cross-section to provide good adhesive surface for holding the paste in place and have cross sectional dimensions in the order of 0.05 inch.

According to the present invention, the grid of the electrode plate which has just been described above is completed by the insertion of vertically extending strips 30 of a conductive material which has a higher electrical conductivity than lead. Almost any metal may be used with aluminum, copper, silver or other well known conductive materials being satisfactory. In view of the desire to keep the cost and weight of the battery at a minimum, aluminum is preferred. Strips 30 are inserted in parallel with and between two adjacent vertically arranged grid bars 24 to be in the central plane of the grid between the horizontal bars 26 and 28. The thickness of strips 30 may be on the order of 0.05 to 0.10 inch and the width on the order of ⅓ inch. Such strips 30 of aluminum thus have a cross-sectional area which is at least 5 times as large as the cross section of the vertically extending bars 24 and a much higher conductivity because of the lower resistance of aluminum as compared with lead or a lead-tin alloy.

To preserve aluminum strips 30 against corrosion in the oxidizing atmosphere in the galvanic cell, it is advantageous to cover strips 30 with lead as by electrode plating. A lead coating having a thickness on the order of 0.10 mm. is preferred. A minimum thickness of at least 50 microns is necessary in order to assure a continuous lead coating so that the metal of strip 30 will be adequately protected. Thicker coatings of for example 0.20 mm. are acceptable, and will work satisfactorily, but such a large thickness is neither necessary nor economical from the point of view of service time in the battery into which this type of electrode is to be incorporated.

In the manufacture of batteries on a commercial basis, all of the grids may be manufactured from one type of mold. Not all of the grids need to have such a low resistance or high conductivity as is provided by the insertion of strips 30 of the conductive material in accordance with the present invention as not all batteries made by a battery manufacturer require such high conductivity and mechanical strength. It is consequently advantageous if only one type of grid is cast and stored. As the grids are pasted, those grids expected to be used in batteries requiring the higher conductivity and larger mechanical strength may then be completed by adding conductive strips and pasting as desired.

The present invention thus solves the related problems in a simple and reliable way and in such manner that the pre-cast grid of ordinary lead or lead alloy is subsequently completed by the adding of conductive strips 30 which results in the desired qualities to the battery. The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a planar electrode plate for use in a lead-acid storage battery, a grid of electrically conductive material including lead, said grid having a marginal frame and groups of angularly related bars, the bars of one group being vertically disposed in a central plane of the electrode plate, the remaining bars being mounted on opposite sides of the bars of said one group and horizontally disposed relative thereto with all of said bars and marginal frame cast as an integral unit and forming an electrically conductive skeleton of said plates; and means for decreasing the internal electrical resistance of the electrode plate and for increasing strength of the plate to prevent buckling comprising at least one strip of metal having higher electrical conductivity and greater mechanical strength to resist bending than material of said grid, insertably mounted along said central plane between a pair of bars of said one group in direct electrical contact with the remaining bars and with said marginal frame, the cross-sectional area of said strip being greater than the cross-sectional area of a vertical bar.

2. An electrode plate as defined in claim 1 further characterized by said remaining group of bars mounted on opposite sides of the bars of said one group forming therewith an unobstructed channel and said means for decreasing the internal electrical resistance of the electrode plate being insertably mounted in said unobstructed channel.

3. An electrode plate as defined in claim 1, further characterized by said remaining group of bars mounted on opposite sides of the bars of said one group forming therewith a plurality of unobstructed channels and said means for decreasing the internal electrical resistance of the electrode plate being insertably mounted in a plurality of said unobstructed channels.

4. An electrode plate as defined in claim 1 wherein the cross-sectional area of said metal strip is at least five times greater than the cross-sectional area of a vertical bar.

5. An electrode plate as defined in claim 4 wherein the metal strip is made of aluminum coated with a layer of lead having a thickness of at least about 50 microns and extends from a location near the lower marginal frame member upwardly along the central plane of said grid skeleton to be in good electrically conducting relation with the upper marginal frame member.

References Cited in the file of this patent

UNITED STATES PATENTS

| | | |
|---|---|---|
| 543,055 | Rooney | July 23, 1895 |
| 888,602 | Fleischer | May 26, 1908 |
| 2,713,079 | Carrick et al. | July 12, 1955 |

FOREIGN PATENTS

| | | |
|---|---|---|
| 493,395 | France | Apr. 29, 1919 |
| 643,087 | Great Britain | Sept. 15, 1950 |